US011852000B2

(12) United States Patent
Crowe et al.

(10) Patent No.: US 11,852,000 B2
(45) Date of Patent: Dec. 26, 2023

(54) MULTI-SPEED TURBINE REDUCTION GEARBOX SYSTEM AND METHOD

(71) Applicant: Signal Power Group Operating LLC, Oro Valley, AZ (US)

(72) Inventors: David Keith Crowe, Tucson, AZ (US); Elden Crom, Tucson, AZ (US)

(73) Assignee: Signal Power Group Operating LLC, Oro Valley, AZ (US)

(*) Notice: Subject to any disclaimer, the term of this patent is extended or adjusted under 35 U.S.C. 154(b) by 0 days.

(21) Appl. No.: 17/919,244

(22) PCT Filed: Feb. 9, 2022

(86) PCT No.: PCT/US2022/015857
§ 371 (c)(1),
(2) Date: Oct. 14, 2022

(87) PCT Pub. No.: WO2022/173858
PCT Pub. Date: Aug. 18, 2022

(65) Prior Publication Data
US 2023/0139271 A1    May 4, 2023

Related U.S. Application Data

(60) Provisional application No. 63/147,578, filed on Feb. 9, 2021.

(51) Int. Cl.
*F02C 7/36* (2006.01)
*E21B 43/26* (2006.01)
(Continued)

(52) U.S. Cl.
CPC .......... *E21B 43/2607* (2020.05); *F01D 15/08* (2013.01); *F01D 15/10* (2013.01);
(Continued)

(58) Field of Classification Search
CPC ...... E21B 43/2607; F01D 15/08; F01D 15/10; F02C 7/36
See application file for complete search history.

(56) References Cited

U.S. PATENT DOCUMENTS 3,866,490 A    2/1975  Orshansky
4,565,106 A    1/1986  Sumiyoshi
(Continued)

OTHER PUBLICATIONS

International Search Report and Written Opinion dated Jun. 21, 2022 in PCT Patent Application No. PCT/US2022/015857.

*Primary Examiner* — Derek D Knight
(74) *Attorney, Agent, or Firm* — Snell & Wilmer L.L.P.

(57) ABSTRACT

Systems, methods, and devices are provided for a turbine driven pump gearbox. A turbine engine may drive a primary shaft having gears. The gears may selectably engage with gears of a secondary shaft that drives a machine (e.g., pump). By changing which gears of the primary shaft engage with which gears of the secondary shaft, a gear ratio may be changed. A power takeoff device (e.g., a generator) may be connected to the primary shaft and may be operated in reverse as a motor to rotate, slow, stop, and/or reverse rotation of the primary shaft. Brakes may be associated with one or more of the primary and secondary shafts. The power takeoff device and one or more of the brakes may be controlled to shift engagement of the shafts between different positions, changing the gear ratio and/or disengaging the shafts from each other.

19 Claims, 7 Drawing Sheets

(51) Int. Cl.
*F01D 15/08* (2006.01)
*F01D 15/10* (2006.01)

(52) U.S. Cl.
CPC ............ *F02C 7/36* (2013.01); *F05D 2220/76* (2013.01); *F05D 2260/4023* (2013.01); *F05D 2260/40311* (2013.01); *F05D 2260/902* (2013.01)

(56) References Cited

U.S. PATENT DOCUMENTS

| | | |
|---|---|---|
| 4,607,541 A | 8/1986 | Miura et al. |
| 5,199,317 A | 4/1993 | Moore et al. |
| 2020/0040878 A1 | 2/2020 | Morris |
| 2020/0318698 A1* | 10/2020 | Bosscher ................ F16D 48/06 |

* cited by examiner

MULTI-SPEED TURBINE REDUCTION GEARBOX SYSTEM AND METHOD

PRIORITY CLAIM

This application is a U.S. national stage entry under 35 U.S.C. § 371 of International Application No. PCT/US2022/015857 filed Feb. 9, 2022, entitled "MULTI-SPEED TURBINE REDUCTION GEARBOX SYSTEM AND METHOD," which claims priority to, and the benefit of, U.S. provisional patent application No. 63/147,578, entitled "MULTI-SPEED TURBINE REDUCTION GEARBOX WITH ETORQUE ISOLATION," filed Feb. 9, 2021, the contents of which are incorporated by reference.

FIELD

This disclosure generally relates to devices, systems, and methods for turbine efficiency, and more particularly to gear reduction in fracing related turbines.

BACKGROUND

In the field of fracing for natural gas, a hole is typically drilled down into a shale layer, and along the shale layer, and then through known methods, water and sand are pumped into the shale to crack the shale and hold it open, such that in later stages of the fracing operation, gas can flow out of the shale layer, to be collected on the surface. The pumping of the water down, sometimes at great depths, such as a mile deep, and pumping the water pressure sufficiently high to crack the shale rock underground can be performed by a turbine driving a water pump.

The turbine is a useful engine because of the readily available natural gas to power the turbine to spin an output drive shaft, which operates the pump. However, typical fracing pump driving turbines are subject to variable torque during operation, causing them to perform sub-optimally in terms of efficiency and environmental performance. Moreover, typical pump driving turbines experience maintenance issues and breakdowns. Thus, it would be desirable to have new systems and methods for improved fracing pump driving turbines.

SUMMARY

A turbine driven pump gearbox system is provided. The system may include a turbine engine. The system may also include a planetary gearbox driven by the turbine engine. A primary shaft is provided and is driven directly by the planetary gearbox. The primary shaft has a first primary shaft gear and a second primary shaft gear. A power takeoff is included for generating power when driven by the primary shaft. A secondary shaft is provided. The secondary shaft has a first secondary shaft gear and a second secondary shaft gear. The secondary shaft also has a collar associated with the secondary shaft for selectively disengaging or engaging the primary shaft and the secondary shaft in at least one of three positions. The three positions include (i) a first engaged position where the first primary shaft gear engages the first secondary shaft gear, (ii) a second engaged position where the second primary shaft gear engages the second secondary shaft gear, and (iii) a disengaged position, being a third position or a neutral position, where the first primary shaft is disengaged from the secondary shaft. The system may also include brakes. For example, there may be a primary shaft brake for braking the primary shaft rotation. There may also be a secondary shaft brake for braking the secondary shaft rotation. The power takeoff device, the primary brake, and the secondary brake are controlled as a clutch to shift the engagement of the primary shaft and the secondary shaft among the first engaged position, second engaged position, and disengaged position.

One may appreciate that in various embodiments the power transmission is a "Z" configuration where power in the primary shaft is in one horizontal plane and the power transmitted in the secondary shaft is in a lower horizontal parallel plane.

The system may include additional aspects, a few of which are provided below. For instances, the power takeoff device may be configured to run as a motor to control the movement of the primary shaft. The power takeoff device may be a generator configured to generate electricity in a generator mode and configured to run as a motor to control the movement of the primary shaft in a motor mode. A shifter may be included. The shifter may be in mechanical connection with the collar to move the collar for selectively disengaging or engaging the primary shaft and the secondary shaft in the at least one of three positions. In various embodiments, a first gear ratio of the first primary shaft gear and the first secondary shaft gear is different than a second gear ratio of the second primary shaft gear and the second secondary shaft gear.

The system may include a controller and/or a sensor. The system may include one or more actuators (e.g., effectors). For instance, an electronic controller may selectably actuate at least one of (i) the power takeoff device to run as a motor to apply a counter rotation force to the first primary shaft and (ii) the primary shaft brake control to apply a braking force to the first primary shaft in concert with the shifting of the primary shaft and the secondary shaft between at least two of the first engaged position, second engaged position, and disengaged position. The sensor may be connected to an outlet of a pump driven by the secondary shaft and may measure a pressure of a fluid pumped by the pump. The controller may also selectably actuate (iii) the shifter to shift the primary shaft and the secondary shaft between at least two of the first engaged position, second engaged position, and disengaged position in response to the pressure exceeding an upper or lower threshold.

The system may include a pump. For instance, the pump may be a hydraulic fracing pump driven by the secondary shaft. The system may be provided with no torque converter between the planetary gearbox and the hydraulic fracing pump.

A switchable pump transmission assembly is provided for a turbine driven pump gearbox system. The switchable pump transmission assembly may include a primary shaft. The primary shaft may be configured to connect to a rotating motive source, the primary shaft having a first primary shaft gear and a second primary shaft gear. The system may have a power takeoff device for generating power when driven by the primary shaft. The system may have a secondary shaft configured to connect to a rotating motive load, the secondary shaft having a first secondary shaft gear and a second secondary shaft gear. The system may have a collar associated with the secondary shaft for selectively disengaging or engaging the primary shaft and the secondary shaft in at least one of three positions. The three positions may include (i) a first engaged position where the first primary shaft gear engages the first secondary shaft gear, (ii) a second engaged position where the second primary shaft gear engages the second secondary shaft gear, and (iii) a disengaged position being a third position or a neutral position, where the first primary shaft is disengaged from the secondary shaft. The assembly may include a primary shaft brake for braking the primary shaft rotation. The power takeoff device and the primary brake may be controlled as a clutch to shift the engagement of the primary shaft and the secondary shaft among the first engaged position, second engaged position, and disengaged position.

The assembly may include additional aspects, a few of which are provided below. The assembly may include a power takeoff device for generating power when driven by the primary shaft. The power takeoff device may be configured to run as a motor to control the movement of the primary shaft. The power takeoff device may be a generator configured to generate electricity in a generator mode and configured to run as a motor to control the movement of the primary shaft in a motor mode. The assembly may include a shifter in mechanical connection with the collar to move the collar for selectively disengaging or engaging the primary shaft and the secondary shaft in the at least one of three positions. A first gear ratio of the first primary shaft gear and the first secondary shaft gear may be different than a second gear ratio of the second primary shaft gear and the second secondary shaft gear.

The assembly may include an electronic controller and/or a sensor. The assembly may include one or more actuators (e.g., effectors). The electronic controller many be connected to the power takeoff device and connected to the primary shaft brake control. The electronic controller may selectably actuate at least one of (i) the power takeoff device to run as a motor to apply a counter rotation force to the first primary shaft and (ii) the primary shaft brake control to apply a braking force to the first primary shaft in concert with the shifting of the primary shaft and the secondary shaft between at least two of the first engaged position, second engaged position, and disengaged position. The sensor may be connected to the electronic controller and may be configured to measure a pressure of a fluid pumped by a pump driven by the secondary shaft. The controller may also selectably actuate (iii) the shifter to shift the primary shaft and the secondary shaft between at least two of the first engaged position, second engaged position, and disengaged position in response to the pressure exceeding an upper or lower threshold. The assembly may include a pump connected to the secondary shaft and driven by a rotation of the secondary shaft. The switchable pump transmission assembly may be provided not including a torque converter. Finally, the assembly may have a secondary shaft brake for braking the secondary shaft rotation.

In various embodiments, a method is provided. The method may be a method of operating a turbine driven pump gearbox system to change at least one of a speed and a torque applied to an input of a hydraulic fracing pump without utilization of a torque converter. The method may include driving, by a turbine engine, a primary shaft of the turbine driven pump gearbox system to rotate. The primary shaft of the turbine driven pump gearbox system has a first primary shaft gear and a second primary shaft gear attached to the primary shaft, the first primary shaft gear and the second primary shaft gear spaced apart along a length of the primary shaft and rotated thereby.

The method may include engaging a first secondary shaft gear of a secondary shaft with the first primary shaft gear. The secondary shaft of the turbine driven pump gearbox system has the first secondary shaft gear and a second secondary shaft gear attached to the secondary shaft, the first secondary shaft gear and the second secondary shaft gear spaced apart along a length of the secondary shaft and rotated thereby.

The method may include driving, by the primary shaft, the secondary shaft in response to the engaging, the secondary shaft providing power to the input of the hydraulic fracing pump. The method may include translating a collar attached to the secondary shaft between the first secondary shaft gear and the second secondary shaft gear, the translating axially shifting the secondary shaft from a first engaged position to a disengaged position.

The method may also include disengaging the first primary shaft gear from the first secondary shaft gear in response to the translating, whereby the primary shaft no longer drives the secondary shaft to rotate when the secondary shaft is in the disengaged position. The method may include further translating the collar, the further translating axially shifting the secondary shaft from the disengaged position to a second engaged position. The method may include engaging, the second primary shaft gear to the second secondary shaft gear in response to the further translating, whereby the primary shaft drives the secondary shaft to rotate. In various embodiments, a combination of the first primary shaft gear and the secondary shaft gear has a first gear ratio and a combination of the second primary shaft gear and the second secondary shaft gear has a second gear ratio that is different from the first gear ratio so that at least one of the speed and the torque applied to the input of the hydraulic fracing pump is different in the first engaged position and in the second engaged position.

In various embodiments, the method also includes rotating the secondary shaft while the secondary shaft is in the disengaged position by an electric motor to align the second primary shaft gear and the second secondary shaft gear for engaging.

A method of operating the turbine driven pump gearbox system to engage the turbine driven pump gearbox system in a drive (engaged) configuration is provided. The method may be executed without utilization of a torque converter. The method may include setting a turbine engine to an idle power setting. The method may include shifting a secondary shaft to a disengaged (e.g., neutral) position. The method may include engaging a primary shaft brake. The method may include engaging a secondary shaft brake. The method may include engaging the primary shaft to the secondary shaft in either the first engaged position or the second engaged position depending on the desired gear ratio. If the shafts engage, then the primary shaft brake is released and the secondary shaft brake is released. If the shafts do not engage, then the method includes shifting the secondary shaft to the disengaged (e.g., neutral) position and pulsing (e.g., disengaging and reengaging) the primary shaft brake. The method then returns to another attempt to engage the shafts. The pulsing of the primary shaft brake will have permitted the primary shaft to rotate so that the teeth of the gears that are being engaged are differently aligned, facilitating meshing together.

A method of operating the turbine driven pump gearbox system to engage the turbine driven pump gearbox system in a drive (engaged) configuration is provided. The method may be executed without utilization of a torque converter. The method may include setting a turbine engine to an idle power setting. The method may include shifting a secondary shaft to a disengaged (e.g., neutral). The method may include engaging a primary shaft brake. The method may include engaging a secondary shaft brake. The method may include releasing the primary shaft brake. The method may include engaging an electric motor, such as a power takeoff device that is a generator being backfed and connected to the primary shaft. The method may include bringing the primary shaft to zero revolutions per minute by the electrical motor. The method may include engaging the primary shaft to a secondary shaft in either the first engaged position or the second engaged position depending on the desired gear ratio. If the shafts engage, then the primary shaft brake is released and the secondary shaft brake is released. If the shafts do not engage, then the method includes shifting the secondary shaft to the disengaged (e.g., neutral) position and rotating, by the electric motor, the primary shaft. In various embodiments, the rotating is less than 25% of a gear tooth width. The method then returns to for another attempt to engage the shafts. The rotating of the primary shaft by the motor will have permitted the primary shaft to rotate so that the teeth of the gears that are being engaged are differently aligned, facilitating meshing together.

BRIEF DESCRIPTION OF DRAWINGS

A more complete understanding of the present disclosure may be derived by referring to the detailed description and claims when considered in connection with the Figures, wherein like reference numbers refer to similar elements throughout the Figures, and:

DETAILED DESCRIPTION

Figure 1A:
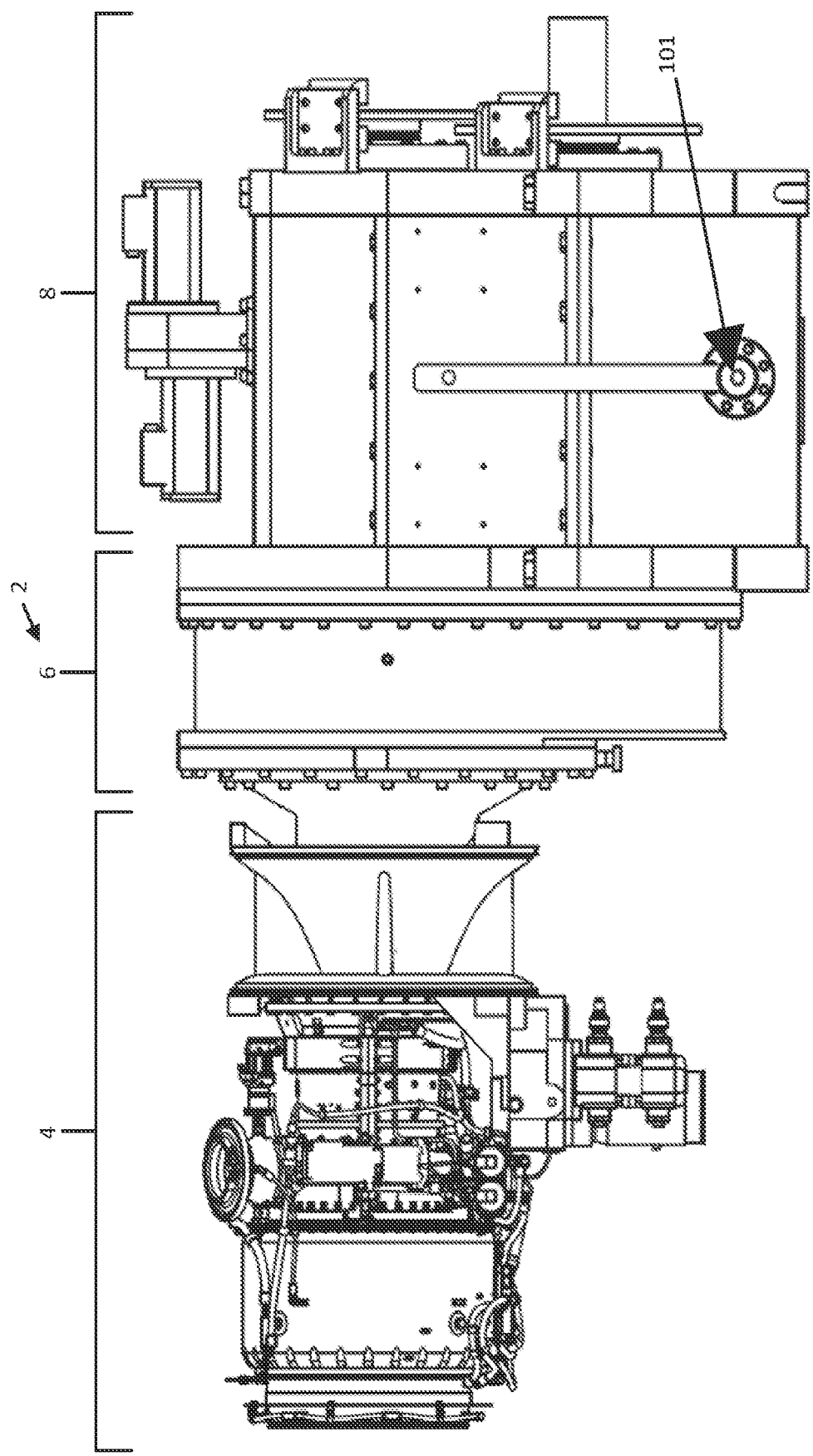
FIG. 1A is an exemplary side view of a turbine driven pump gearbox system, in accordance with various embodiments.

In an example embodiment, a turbine driven pump gearbox and method for operating the same is disclosed. A pump may be driven by a turbine engine. The pump may be configured to pump a fluid (e.g., water and/or a sand/water mixture) into the ground to pressurize a portion of the ground to cause the rocks and other subterranean structures in that portion of the ground to crack and remain cracked, for the purpose of extracting hydrocarbon, such as oil or gas, from the ground in proximity to that portion of the ground. Thus, the pump may facilitate fracing.

In an example embodiment, the pump may be configured to pump over a wide range of pressures, such as 7,000 PSI-13,000 PSI (about 48.26 MPa-about 89.63 MPa). Thus, the torque to drive the pump may vary accordingly over a wide range. In an example embodiment, a turbine may drive the pump via a gearbox. The turbine may be configured to drive the gearbox and the gearbox may be configured to shift the gears between at least one of three states: a first gear ratio state, a second gear ratio state, and a neutral state. Thus, in an example embodiment, a turbine driven pump gear box is provided that facilitates efficient and environmentally beneficial operation of the turbine engine in driving the pump over a variety of pressure load conditions or in an idle configuration so that the transmission is in the neutral state and the gas turbine is disconnected from the pump.

In addition to different pressure configurations, which give rise to different torque requirements, many gas turbine engines exhibit significant increases in efficiency (e.g., reduced fuel consumption and the like) when operating so that a output shaft of the turbine is turning at greater than or equal to about 95% of a nominal operating speed. This requirement makes pumping with a pump powered by the turbine engine difficult when different speeds are needed to achieve pumping flow, pressure, volume, and other specifications. In some instances, traditional torque converters are not suitable for the high horsepower involved in pumping operations or with turbine engines. In some instances, traditional torque converters generate excessive waste heat or inefficiencies. Furthermore, and particularly for hydraulic fracing pumps, many pumps have significant auxiliary components for cooling and/or for lubrication. These auxiliary components have different horsepower and other requirements. In various prior attempts, secondary auxiliary power units (APUs) provide auxiliary power to fulfill the requirements of the auxiliary components.

In many oil and gas applications, a pump may be connected to a turbine transmission as disclosed herein. The pump may, when under a constant fluid pressure (such as a constant pressure greater than about 8000 PSI or about 55.2 MPa) keeps a generally constant torque on a transmission. If the connection between the pump and the turbine is to be shifted between different gear configurations, the transmission must disengage and reengage the operative connection between the turbine and the pump.

Thus, there is a need for a transmission that is able to (1) shift under load and have a neutral gear, (2) provide a power take off to deliver auxiliary power to other machines, (3) generate electricity to power other machines, (4) shift between different speeds or torques, and (5) operate in a high horsepower environment with high reliability.

The systems, methods, and devices disclosed herein address these challenges. For instance, auxiliary power may be provided by a power take off device (PTO device) incorporated into a transmission for turbines. The PTO device may be connected to or include an electrical generator. Furthermore, changing the torque and speed applied by the turbine to a pump enables the pump aspect of the system to meet the different pumping flow, pressure, volume, and other specifications while enabling the turbine aspect of the system to operate in an efficient power band. In one example embodiment, a system provided herein is geared to drive a pump delivering two different pressures depending on the configuration of the system. For instance, the system may be switchable between delivering 10,000 PSI (about 68.95 MPa) and 12,500 PSI (about 86.2 MPa) at the well. The same system may also incorporate a power take off with a 60 kilowatt electrical generator to provide auxiliary power to other machines.

Figure 1B:
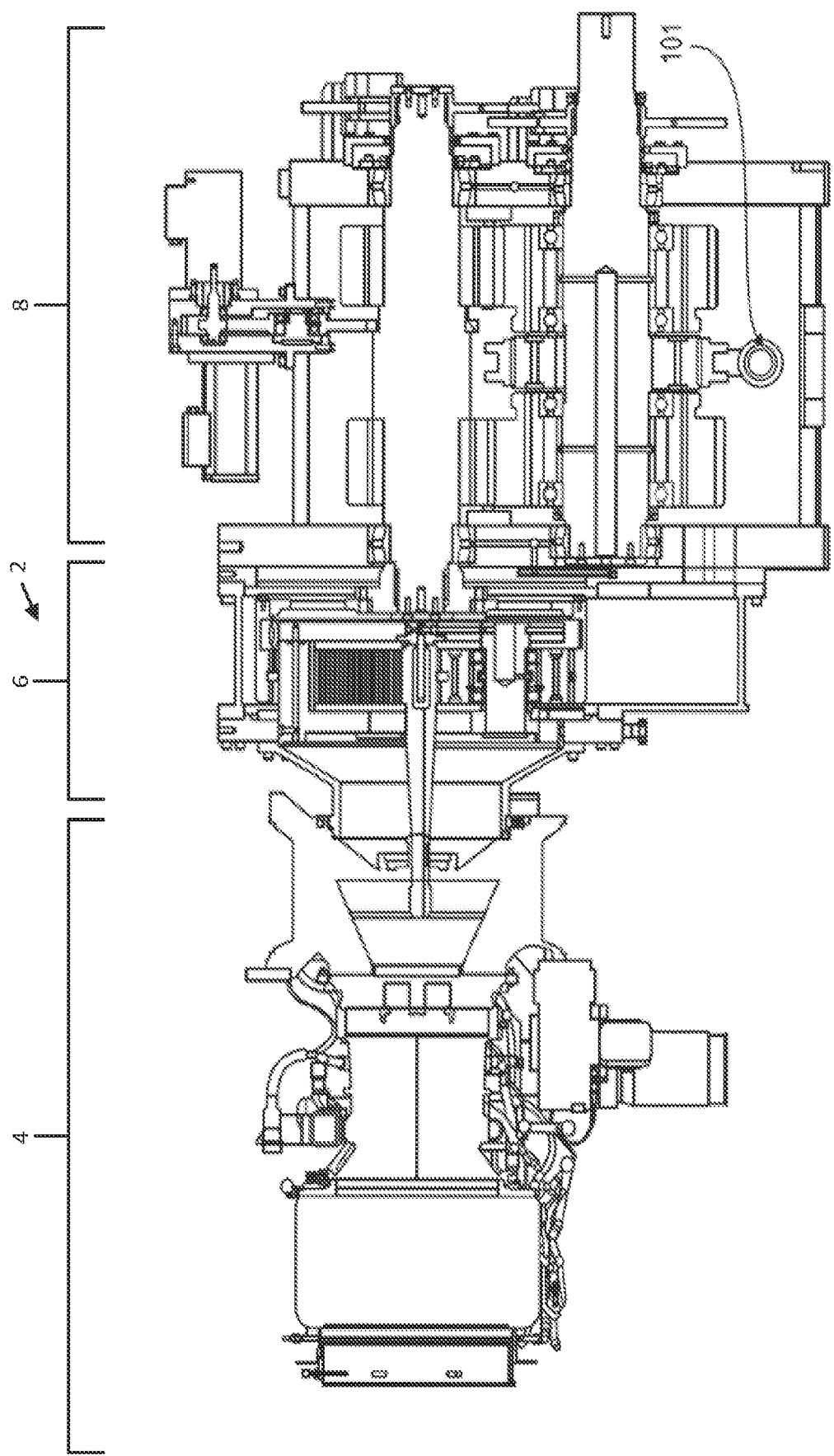
FIG. 1B is an exemplary side section view of a turbine driven pump gearbox system, in accordance with various embodiments.

Having briefly introduced aspects of systems, methods, and devices, attention is now directed to FIGS. 1A-B for a more detailed discussion of a turbine driven pump gearbox system 2. A turbine driven pump gearbox system 2 may include a system for engaging a turbine engine 4 to a pump and selectably adjusting a gear ratio between the turbine and the pump as well as generating electrical power or implementing one or more other power take off (PTO) drive from the turbine. For example, the turbine driven pump gearbox system 2 may include a turbine engine 4. The turbine engine 4 may be a high-bypass turbine, or a low-bypass turbine, or may be an industrial turbine, or an aviation turbine, or any other gas turbine engine as desired. The turbine engine 4 may be a diesel turbine, a kerosene turbine, a natural gas turbine or any other type of turbine as desired. In various embodiments, for use with a hydraulic fracing pump or another oil and gas production or exploration embodiment, the turbine engine 4 may be a natural gas turbine and may burn readily available natural gas being produced from a subterranean geologic structure.

The turbine driven pump gearbox system 2 may include a planetary gearbox 6. The planetary gearbox 6 may be driven by the turbine engine 4. The planetary gearbox 6 may convert the energy delivered by the gas turbine engine into a shaft rotation. For example, the planetary gearbox 6 may provide a connection between the gas turbine engine to convert the fluid dynamical energy of the high velocity gases/heat from the turbine engine into a mechanical shaft rotation. The connection may be a slip connection. The planetary gearbox 6 may have a gear ratio. For instance, the planetary gearbox 6 may have a gear ratio of 7 to 9, or about 8 or about 8.55 or 8.55 or any other ratio as desired.

The turbine driven pump gearbox system 2 may include a switchable pump transmission assembly 8. The switchable pump transmission assembly 8 may connect to an output shaft of the planetary gearbox 6. The switchable pump transmission assembly 8 may also connect to a device being driven by the turbine engine 4, such as a hydraulic fracing pump or other machinery. The switchable pump transmission assembly 8 may provide for changing of a gear ratio of the connection between the output shaft of the planetary gearbox 6 and the machinery such as the hydraulic fracing pump. The switchable pump transmission assembly 8 may accomplish the changing without incorporating a torque converter. As such, torques that are not feasibly switched by a torque converter, or implementations where a torque converter would generate excessive heat or introduce excessive inefficiencies are readily addressed.

Figure 2:
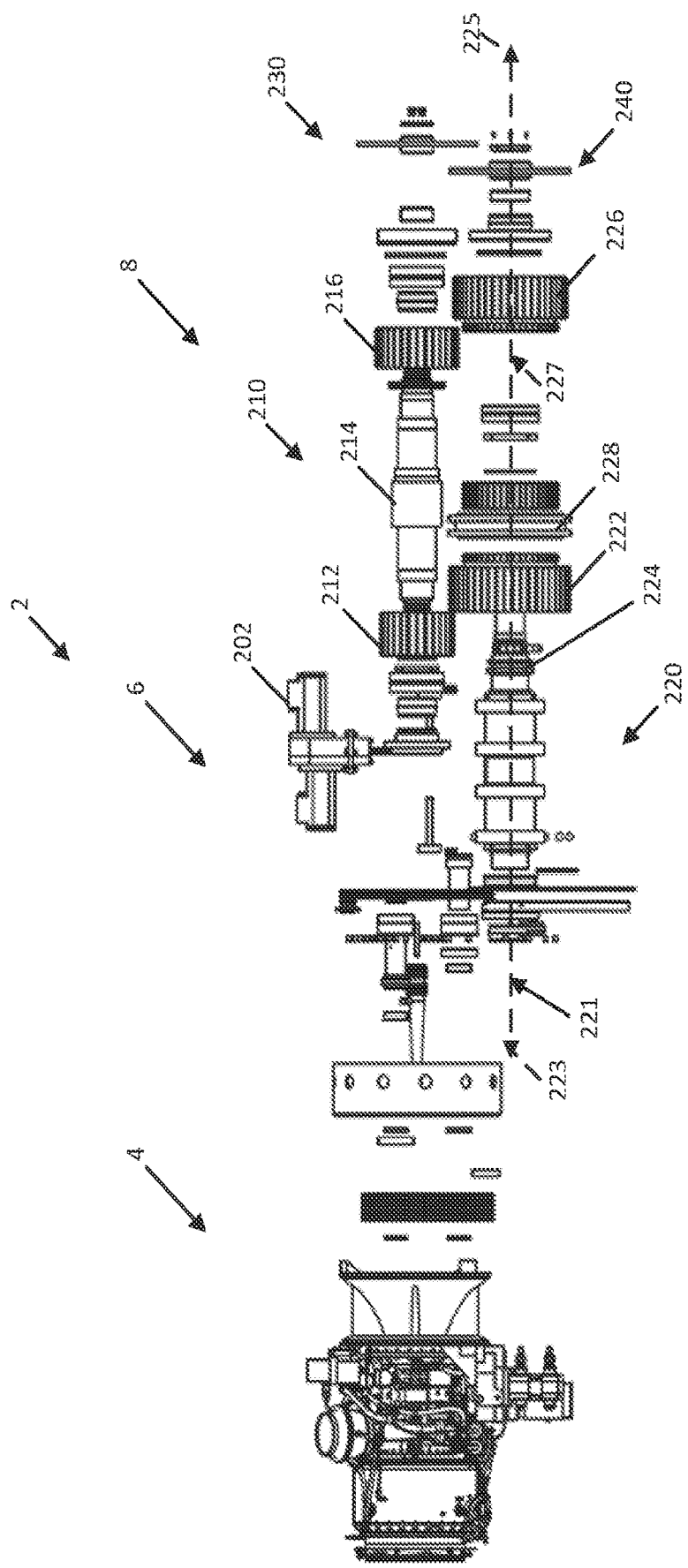
FIG. 2 is an exploded view of components of a turbine driven pump gearbox system, in accordance with various embodiments.

Directing attention to FIG. 2, various aspects of the switchable pump transmission assembly 8 are now discussed in detail. The switchable pump transmission assembly 8 may include a primary shaft assembly 210. The primary shaft assembly 210 comprises a collection of rotating components that connect to a mechanical input of the switchable pump transmission assembly 8. For example, the switchable pump transmission assembly 8 may include a primary shaft assembly 210. The primary shaft assembly 210 may connect to a rotating motive source, such as the turbine engine 4 via the planetary gearbox 6. In various embodiments, the primary shaft assembly 210 includes a first primary shaft gear 212, and a second primary shaft gear 216 both connected to a primary shaft 214 and spaced apart along a length of the primary shaft 214. The primary shaft 214 may be driven directly (e.g., mechanically interconnected to) by the planetary gearbox 6.

The switchable pump transmission assembly 8 may also include a secondary shaft assembly 220. The secondary shaft assembly 220 comprises a collection of rotating components that selectably connects to or disconnects from the primary shaft assembly 210. The secondary shaft assembly 220 may also connect to a rotating motive load, such as a pump or other machine to be driven by the turbine. In various embodiments, the secondary shaft assembly 220 includes a first secondary shaft gear 222, and a second secondary shaft gear 226 both connected to a secondary shaft 224 and spaced apart along a length of the secondary shaft 224. The secondary shaft assembly 220 may also have a collar 228 associated with (e.g., permanently or selectably connected to) the secondary shaft 224. The collar 228 may be located along the length of the secondary shaft 224 between the first secondary shaft gear 222 and the second secondary shaft gear 226. In other embodiments, the collar 228 may be located at another location along the length of the secondary shaft 224, such as toward an end of the secondary shaft 224. The collar 228 may be for selectably disengaging or engaging the primary shaft 214 of the primary shaft assembly 210 and the secondary shaft 224 of the secondary shaft assembly 220 in at least one of three positions, which will be outlined further in later paragraphs.

The secondary shaft assembly 220 may connect to the primary shaft assembly 210 via an interlocking of one or more gear of the secondary shaft assembly 220 with one or more gear of the primary shaft assembly 210. In this manner, when the primary shaft assembly 210 is rotating, the primary shaft assembly 210 may impel the secondary shaft assembly 220 to rotate. However, because the secondary shaft assembly 220 rotates in response to interlocking of gears, a gear ratio may be established between the primary shaft assembly 210 and the secondary shaft assembly 220. Also, because each shaft assembly has multiple gears, the collar 228 may be used to manipulate the secondary shaft assembly 220 to change which gears are interlocked. By changing which gears are interlocked, the gear ratio may be changed. Furthermore, the gears may be made to disengage, causing the secondary shaft assembly 220 to decouple from the primary shaft assembly 210. This configuration may be termed a "neutral" configuration. In a neutral configuration, the turbine engine 4 may be running at a high power output, while secondary shaft assembly 220 may be stationary. Thus, the secondary shaft 224 may be selectively disengaged or engaged from the primary shaft 214 in at least one of three positions. The positions may include a first engaged position 223 where the first primary shaft gear 212 engages the first secondary shaft gear 222. The positions may include a second engaged position 225 where the second primary shaft gear 216 engages the second secondary shaft gear 226. Finally, the positions may include a disengaged position 227, being a third position or a neutral position, where the first primary shaft 214 is disengaged from the secondary shaft 224. In various embodiments, the turbine driven pump gearbox system 2 may be controlled as a clutch to shift an engagement of the primary shaft 214 and the secondary shaft 224 among the first engaged position, second engaged position, and disengaged position. For instance, while these parts will be detailed further below, a power takeoff device 202, a primary shaft brake 230, and a secondary shaft brake may be variously controlled as a clutch to shift the engagement of the primary shaft 214 and the secondary shaft 224 among the first engaged position, second engaged position, and disengaged position.

One may appreciate that in various embodiments the power transmission from an input to the primary shaft assembly 210 to an output of the secondary shaft assembly 220 may be in a "Z" configuration where power in the primary shaft 214 is in one horizontal plane and the power transmitted in the secondary shaft 224 is in a lower horizontal parallel plane that is also horizontal but vertically spaced apart from the horizontal plane of the primary shaft and that is parallel to the horizontal plane of the primary shaft.

Having introduced the primary shaft assembly 210 and the secondary shaft assembly 220, attention is now shifted to a more detailed discussion of specific features of the primary shaft assembly 210.

The primary shaft 214 of the primary shaft assembly 210 may be a cylindrical shaft, or a hexagonal shaft, or a square shaft, or any shape shaft as desired. The primary shaft 214 may receive an input of mechanical torque and may rotate. As the primary shaft 214 rotates, the first primary shaft gear 212 and the second primary shaft gear 216 also rotate.

The first primary shaft gear 212 comprises a mechanical gear attached to the primary shaft 214 and rotating with the primary shaft 214. The first primary shaft gear 212 may be disposed annularly about the primary shaft 214. The first primary shaft gear 212 may be integrated into the primary shaft 214 as a unitary machined, milled, or otherwise one-piece part. The first primary shaft gear 212 may be welded to the primary shaft 214, or attached with fasteners to the primary shaft 214, or otherwise coupled to or integrated in the primary shaft 214.

The second primary shaft gear 216 comprises a mechanical gear attached to the primary shaft 214 and rotating with the primary shaft 214. The second primary shaft gear 216 may be disposed annularly about the primary shaft 214. The second primary shaft gear 216 may be integrated into the primary shaft 214 as a unitary machined, milled, or otherwise one-piece part. The second primary shaft gear 216 may be welded to the primary shaft 214, or attached with fasteners to the primary shaft 214, or otherwise coupled to or integrated in the primary shaft 214. As mentioned, the first primary shaft gear 212 and the second primary shaft gear 216 may be spaced apart along a length of the primary shaft 214.

Shifting focus from the primary shaft assembly 210 to the secondary shaft assembly 220, various specific features of the secondary shaft assembly 220 are detailed below.

The secondary shaft 224 of the secondary shaft assembly 220 may be a cylindrical shaft, or a hexagonal shaft, or an square shaft, or any shape shaft as desired. The secondary shaft 224 may receive an input of mechanical torque and may rotate. As the secondary shaft 224 rotates, the first secondary shaft gear 222 and the second secondary shaft gear 226 also rotate.

The first secondary shaft gear 222 comprises a mechanical gear attached to the secondary shaft 224 and rotating with the secondary shaft 224. The first secondary shaft gear 222 may be disposed annularly about the secondary shaft 224. The first secondary shaft gear 222 may be integrated into the secondary shaft 224 as a unitary machined, milled, or otherwise one-piece part. The first secondary shaft gear 222 may be welded to the secondary shaft 224, or attached with fasteners to the secondary shaft 224, or otherwise coupled to or integrated in the secondary shaft 224.

The second secondary shaft gear 226 comprises a mechanical gear attached to the secondary shaft 224 and rotating with the secondary shaft 224. The second secondary shaft gear 226 may be disposed annularly about the secondary shaft 224. The second secondary shaft gear 226 may be integrated into the secondary shaft 224 as a unitary machined, milled, or otherwise one-piece part. The second secondary shaft gear 226 may be welded to the secondary shaft 224, or attached with fasteners to the secondary shaft 224, or otherwise coupled to or integrated in the secondary shaft 224. As mentioned, the first secondary shaft gear 222 and the second secondary shaft gear 226 may be spaced apart along a length of the secondary shaft 224.

Importantly, the secondary shaft assembly 220 may also comprise the previously mentioned collar 228. The collar 228 may comprise a rotating structure that rotates with the secondary shaft 224 and provides one or more surface for the application of a translational force to the secondary shaft 224. The collar 228 may provide a flange extending annularly about the secondary shaft 224 and extending radially outward from the secondary shaft 224. The collar 228 thus may provide a flange for exerting an axial pressure on the secondary shaft 224 to shift the secondary shaft 224 along a shaft translation axis 221. The collar 228 may permit the secondary shaft 224 to be shifted along a shaft translation axis 221. This shifting allows the different gears to mesh and unmesh with corresponding gears of the primary shaft assembly 210. For instance, the shifting allows the secondary shaft assembly 220 to shift among a first engaged position 223 such as a first engaged position associated with one gear ratio, a second engaged position 225 such as a second engaged position associated with a different gear ratio, and a disengaged position 227 such as a third position or a neutral position associated with a disconnection of the primary shaft assembly 210 and the secondary shaft assembly 220.

In one non-limiting example, the collar 228 comprises a channel defined between two radially extending flanges. An arm of a shifter 101 (FIG. 1A-B) rides inside the channel and moves to press against one or the other of the two radially extending flanges. At least a portion of the secondary shaft 224 of the secondary shaft assembly 220 is axially slidably. For instance, at least a portion of the secondary shaft 224 may be axially slidable (e.g., translatable and/or telescoping) in a bearing or a bushing, or another supporting structure that permits axial movement of a rotating shaft. Thus, an arm riding in the collar 228 may be connected to a shifter 101 (FIG. 1A-B). The shifter 101 may be in mechanical connection with the collar 228 to move the collar 228 for selectively disengaging or engaging the primary shaft 214 and the secondary shaft 224 in the at least one of three positions.

As the shifter 101 (FIG. 1A-B) is moved, the arm exerts a pressure against one or the other of the two radially extending flanges of the collar 228 and at least a portion of the secondary shaft 224 slides (e.g., translates or telescopes) axially. In this manner, the first secondary shaft gear 222 is brought into a meshing relationship with the first primary shaft gear 212 or is brought out of a meshing relationship with the first primary shaft gear 212. Similarly, the second secondary shaft gear 226 is brought into a meshing relationship with the second primary shaft gear 216 or is brought out of a meshing relationship with the second primary shaft gear 216. By appropriately spacing the gears on the respective shafts, the gears may be arranged so that only one pair of the gears (e.g., one gear of the primary shaft assembly 210 and one gear of the secondary shaft assembly 220) are in a meshing relation at any time. Consequently, by sliding the secondary shaft 224, the gear ratio of the coupling of the primary shaft assembly 210 and the secondary shaft assembly 220 may be changed. For instance, a first gear ratio of the first primary shaft gear 212 and the first secondary shaft gear 222 may be engaged when the secondary shaft 224 is in one position (such as a first engaged position 223) and a different (e.g., second gear ratio) gear ratio of the second primary shaft gear 216 and the second secondary shaft gear 226 may be engaged when the secondary shaft 224 is in a different position (such as a second engaged position 225). The first gear ratio and the secondary gear ratio may be different ratios. In various embodiments, a further configuration contemplates an axial positioning of the secondary shaft assembly 220 so that no gears are in a meshing relation. Such an orientation may be termed a "neutral" position.

In various embodiments, the switchable pump transmission assembly 8 includes a primary shaft brake 230 for braking primary shaft 214 rotation. The primary shaft brake 230 may include one or more stator and rotor. The primary shaft brake 230 may include one or more disc and brake puck. The primary shaft brake 230 may include one or more brake shoe and brake drum. The primary shaft brake 230 may include a brake stack of multiple stators and rotors. The primary shaft brake 230 comprises a brake in selectable mechanical communication with the primary shaft 214 of the primary shaft assembly 210 to apply force resisting rotation of the primary shaft 214 and slowing or stopping a rotation of the primary shaft assembly 210, including the first primary shaft gear 212, the second primary shaft gear 216 and the primary shaft 214.

In various embodiments, the switchable pump transmission assembly 8 includes a secondary shaft brake 240 for braking secondary shaft rotation. The secondary shaft brake 240 may include one or more stator and rotor. The secondary shaft brake 240 may include one or more disc and brake puck. The secondary shaft brake 240 may include one or more brake shoe and brake drum. The secondary shaft brake 240 may include a brake stack of multiple stators and rotors. The secondary shaft brake 240 comprises a brake in selectable mechanical communication with the secondary shaft 224 of the secondary shaft assembly 220 to apply force resisting rotation of the secondary shaft 224 and slowing or stopping a rotation of the secondary shaft assembly 220, including the first secondary shaft gear 222, the second secondary shaft gear 226 and the secondary shaft 224.

The switchable pump transmission assembly 8 may include a power takeoff device 202. The power takeoff device 202 (PTO) may be connected to a shaft of the switchable pump transmission assembly 8 and may facilitate transmission of motive energy to other aspects apart from the primary shaft assembly 210 and secondary shaft assembly 220. For example, the power takeoff device 202 may comprise a mechanical connection to the primary shaft assembly 210 to drive a mechanical device. The power takeoff device 202 may comprise an electrical generator. The electrical generator may be connected to the primary shaft 214 and may generate electricity. In various instances, the power takeoff device 202 is configured to run as a motor to control a movement of the primary shaft 214. In other instances, the power takeoff device 202 is a generator configured to generate electricity in a generator mode and configured to run as a motor to control the movement of the primary shaft 214 in a motor mode.

In further instances, the electrical generator may also operate as a motor and may manipulate forces on the primary shaft assembly 210 and/or rotation or positioning of the primary shaft assembly 210. For instance, the electrical generator may be backfed with electricity and may provide braking to a rotation of the primary shaft assembly 210. In various instances, the electrical generator may be backfed with electricity and may provide rotation to the primary shaft assembly 210.

For instance, the electrical generator may cause the primary shaft assembly 210 to rotate in a clockwise or counterclockwise direction. The electrical generator may provide a counter rotation force that opposes a rotation of the primary shaft assembly 210 caused by the turbine engine 4. This may be useful for slowing or stopping the primary shaft assembly 210, such as when meshing and unmeshing different gears to change a gear ratio between the primary shaft assembly 210 and the secondary shaft assembly 220. This is also useful for causing the primary shaft assembly 210 to rotate briefly or in small amounts to properly align teeth of gears for meshing during meshing and unmeshing of different gears. Yet furthermore, this may also be useful for providing complementary rotation force that favors a rotation of the primary shaft assembly 210 caused by the turbine engine 4 to facilitate startup or to provide supplemental torque. In still further instances, the electrical generator may have an output that may be selectively backfed with varying current or voltage, or shorted or grounded, to impart a counter rotation force or an electrical braking force to the primary shaft assembly 210.

Figure 3:
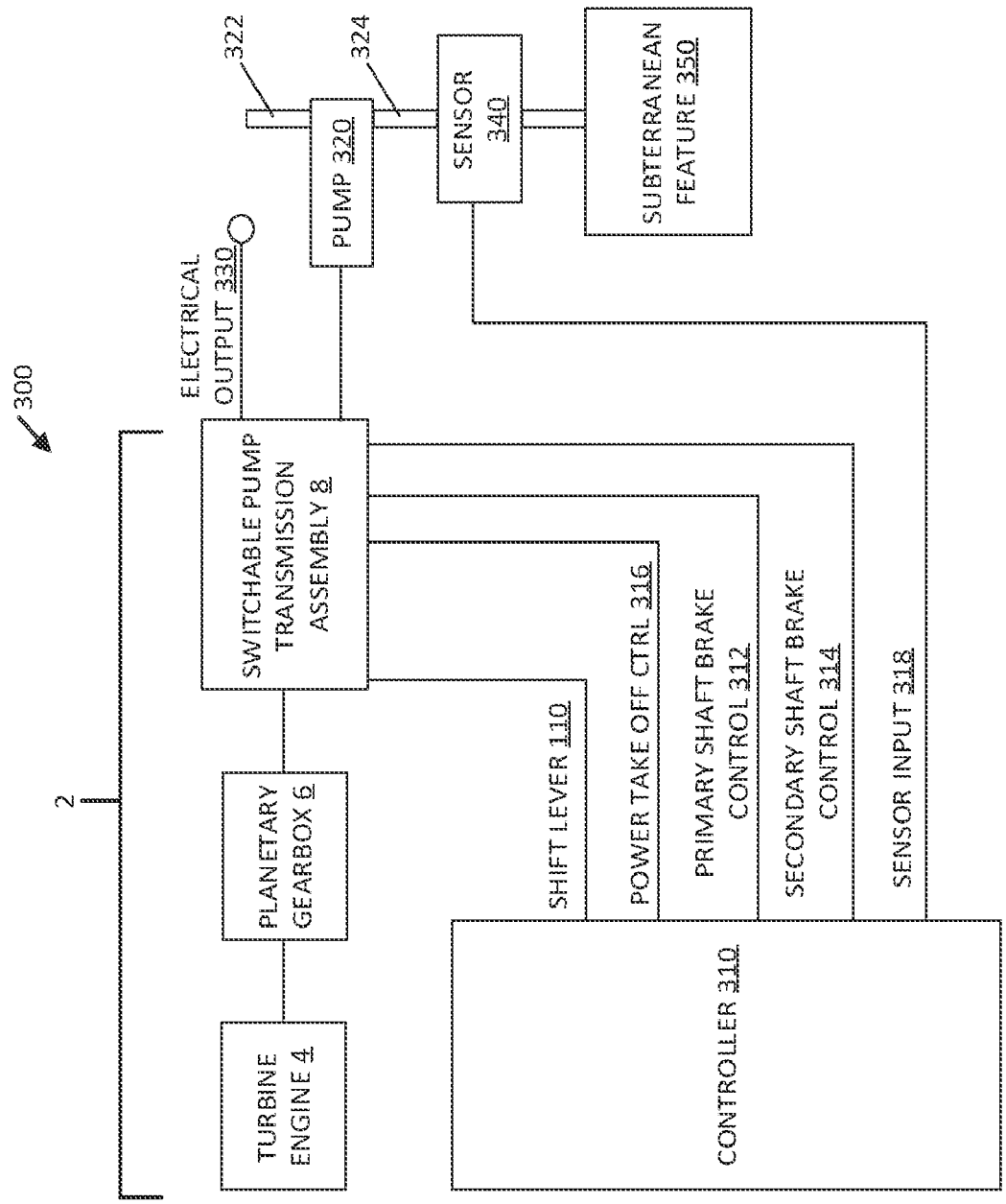
FIG. 3 is a block diagram of an automated turbine driven pump gearbox system having an electronic controller, in accordance with various embodiments.

Turning now to FIG. 3, an automated turbine driven pump gearbox system 300 having an electronic controller 310 is also contemplated. The electronic controller 310 selectably actuates at least one of (i) the power takeoff device to run as a motor to apply a counter rotation force to the first primary shaft and (ii) a primary shaft brake control to actuate a primary shaft brake to apply a braking force to the first primary shaft in concert with the shifting of the primary shaft and the secondary shaft between at least two of the first engaged position, second engaged position, and disengaged position. The electronic controller 310 may interoperate with other aspects of a turbine drive pump gear box system 2. The turbine drive pump gear box system 2 as already discussed may be implemented with a turbine engine 4, a planetary gearbox 6, and a switchable pump transmission assembly 8.

Additionally, the switchable pump transmission assembly 8 may drive a pump 320, such as a hydraulic fracing pump. The hydraulic fracing pump may be driven by the secondary shaft and, there may be no torque converter between the planetary gearbox and the hydraulic fracing pump. The pump 320 may have a fluid inlet 322 and a fluid outlet 324. The fluid inlet 322 receives lower pressure fluid for pumping and the fluid outlet 324 expels higher pressure fluid. For instance, the fluid outlet 324 may expel fracing fluid into a subterranean feature 250. In various instances, a sensor 340 is implemented in a fluid path of the fluid. The sensor 340 is connected to an outlet of a pump 320 driven by the secondary shaft and measures a pressure of a fluid pumped by the pump. In FIG. 3, a sensor 340 is shown in the fluid outlet 324 path, though other sensor locations such as within the subterranean feature 250, in the fluid inlet 322 path, or elsewhere in the system of pipes and connections attaching the pump 320 to the subterranean feature 350 (e.g., in the fracing iron) may be contemplated.

The switchable pump transmission assembly 8 may also have an electrical output 330. The electrical output 330 may be a power output of a power takeoff device 202 that is a generator. This electrical output 330 may provide electricity to run electronic aspects such as a sensor 340 or controller 310, and/or the like.

Finally, the system 300 includes a controller 310. The controller 310 may include a commodity PC, or a programmable logic controller, or a single-board computer, or any other control system that can receive data from sensors and drive effectors. The controller 310 may include effectors such as servos, motors, and actuators. For instance, the controller 310 may move a shift lever 110 (See FIG. 1A-B) to shift the switchable pump transmission assembly 8 to different gears or to a neutral configuration. The controller 310 may have a primary shaft brake control 312 that includes an effector to actuate the primary shaft brake 230 (FIG. 2). The controller 310 may have a secondary shaft brake control 314 that includes an effector to actuate the secondary shaft brake 240 (FIG. 2). The controller 310 may have a power takeoff control 316 that includes an effector, or an electrical driving circuit, or the like, to actuate the power takeoff device 202 such as to cause the generator to operate as a motor and effect rotation of the primary shaft assembly 210 (FIG. 2). The controller 310 may include a sensor input 318 to receive measured pressures from the sensor 340 and to operate the aforementioned effectors in order to shift the gears of the switchable pump transmission assembly 8. In this manner, the controller 310 may maintain a fluid pressure sensed by the sensor 340 between an upper pressure limit and a lower pressure limit by altering the gear ratio of the switchable pump transmission assembly 8 that drives the pump. Stated differently, the sensor 340 is connected to the controller 310. The controller 310 selectably actuates the shifter to shift the primary shaft and the secondary shaft between at least two of the first engaged position, second engaged position, and disengaged position in response to the pressure exceeding an upper or lower threshold. Further, the electronic controller 310 selectably actuates at least one of (i) the power takeoff device to run as a motor to apply a counter rotation force to the first primary shaft and (ii) the primary shaft brake control 312 to apply a braking force to the first primary shaft in concert with the shifting of the primary shaft and the secondary shaft between at least two of the first engaged position, second engaged position, and disengaged position.

Figure 4:
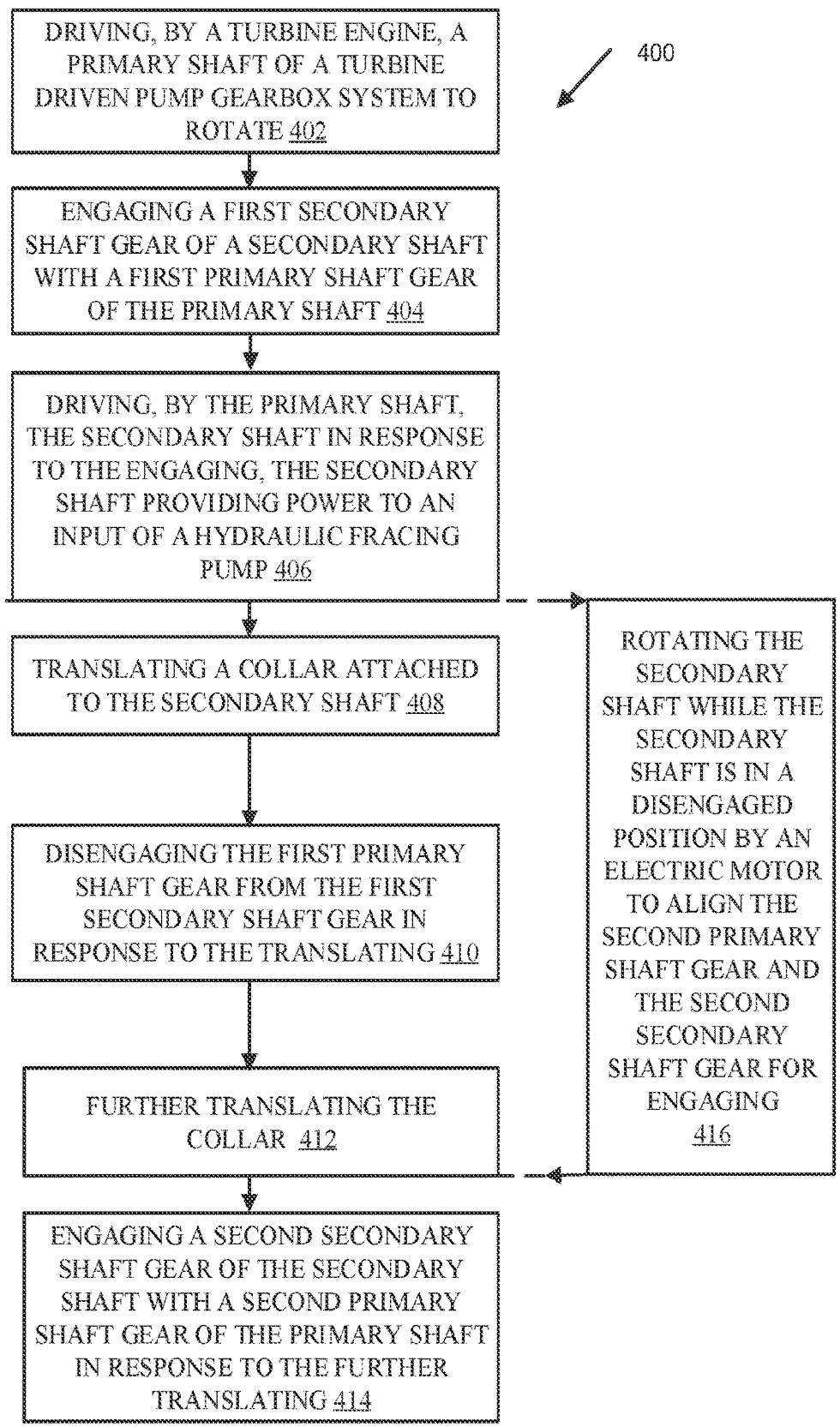
FIG. 4 illustrates a flow chart of a method of operating the turbine driven pump gearbox system to change at least one of a speed and a torque applied to an input of a hydraulic fracing pump, in accordance with various embodiments.

With the different components and the various operative relationships among the components of the systems and devices outlined above, now is a convenient time to discuss a method of operating a turbine drive pump gearbox system. With reference to FIG. 4, and continuing reference to FIGS. 1A-3, a method 400 of operating the turbine driven pump gearbox system to change at least one of a speed and a torque applied to an input of a hydraulic fracing pump is provided. The method may be executed without utilization of a torque converter.

The method may include driving, by a turbine engine 4, a primary shaft 214 of the turbine driven pump gearbox system 2 to rotate (block 402). In various instances, the primary shaft 214 of the turbine driven pump gearbox system 2 has a first primary shaft gear 212 and a second primary shaft gear 216 attached to the primary shaft 214, the first primary shaft gear 212 and the second primary shaft gear 216 spaced apart along a length of the primary shaft 214 and rotated thereby.

The method may include engaging a first secondary shaft gear 222 of a secondary shaft 224 with the first primary shaft gear 212 of the primary shaft 214 (block 404). The secondary shaft 224 of the turbine driven pump gearbox system 2 has the first secondary shaft gear 222 and a second secondary shaft gear 226 attached to the secondary shaft 224, the first secondary shaft gear 222 and the second secondary shaft gear 226 spaced apart along a length of the secondary shaft 224 and rotated thereby.

The method may also include driving, by the primary shaft 214, the secondary shaft 224 in response to the engaging, the secondary shaft 224 providing power to the input of the hydraulic fracing pump 320 (block 406). The method may include translating a collar 228 attached to the secondary shaft 224 between the first secondary shaft gear 222 and the second secondary shaft gear 226 (block 408). The translating axially shifts the secondary shaft 224 from a first engaged position to a disengaged position.

The method contemplates disengaging the first primary shaft gear 212 from the first secondary shaft gear 222 in response to the translating (block 410). In this manner, the primary shaft 214 no longer drives the secondary shaft 224 to rotate when the secondary shaft 224 is in the disengaged position.

The method continues with further translating the collar 228 (block 412). The further translating axially shifts the secondary shaft 224 from the disengaged position to a second engaged position.

Finally, the method includes engaging, the second secondary shaft gear 226 to the second primary shaft gear 216 in response to the further translating (block 414). Consequently, the primary shaft 214 drives the secondary shaft 224 to rotate.

The combination of the first primary shaft gear 212 and the first secondary shaft gear 222 gear has a first gear ratio and a combination of the second primary shaft gear 216 and the second secondary shaft gear 226 has a second gear ratio that is different from the first gear ratio so that at least one of the speed and the torque applied to the input of the hydraulic fracing pump 320 is different in the first engaged position and in the second engaged position. Moreover, at various points in the method one or more of the brakes may be engaged to change the rotation of one or more shaft or stop the rotation of one or more shaft. Similarly, the power takeoff device 202 (such as a generator) may be engaged to change the rotation of one or more shaft or stop the rotation of one or more shaft. The power takeoff device 202 may also be engaged to cause one or more shaft to rotate, such as to properly register teeth of different gears to facilitate meshing. Stated differently, the method may include rotating the secondary shaft 224 while the secondary shaft 224 is in the disengaged position by an electric motor (e.g., a generator being backfed) to align the second primary shaft gear 216 and the second secondary shaft gear 226 for engaging (block 416). Notably, while block 416 is illustrated adjacently to various other blocks, block 416 may also include dwell periods during which the power takeoff device 202 is not engaged to cause one or more shaft to rotate, depending on the nature and extent of movement required to facilitate meshing of the gears.

Figure 5:
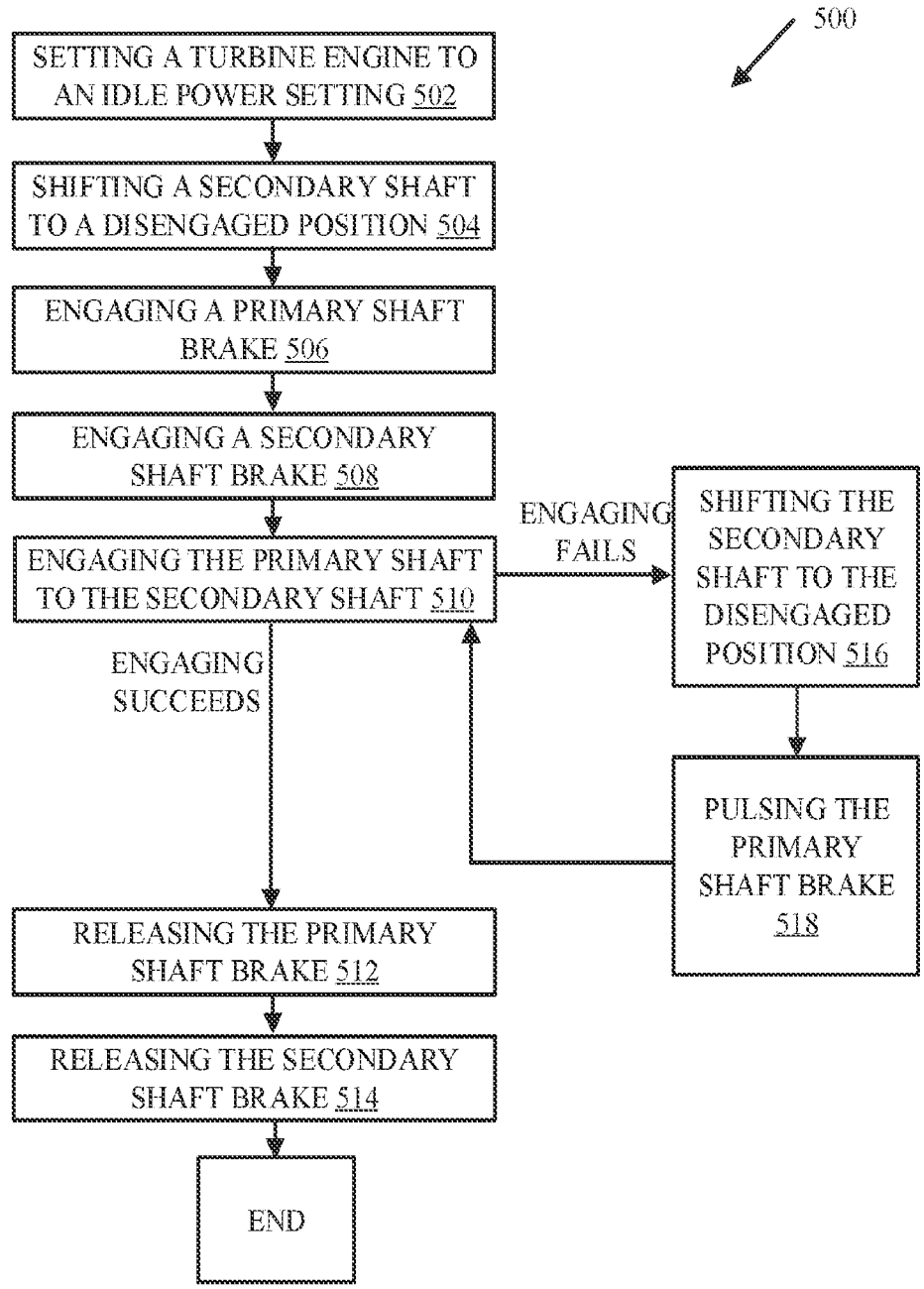
FIGS. 5-6 illustrate flow charts of methods of operating the turbine driven pump gearbox system to engage the turbine driven pump gearbox system in a drive (engaged) configuration, in accordance with various embodiments.

With reference to FIG. 5, and continuing reference to FIGS. 1A-3, a method 500 of operating the turbine driven pump gearbox system to engage the turbine driven pump gearbox system in a drive (engaged) configuration is provided. The method may be executed without utilization of a torque converter. The method may include setting a turbine engine 4 to an idle power setting (block 502). The method may include shifting the secondary shaft 224 to a disengaged (e.g., neutral) position (block 504). The method may include engaging a primary shaft brake 230 (block 506). The method may include engaging a secondary shaft brake 240 (block 508). The method may include engaging the primary shaft 214 to the secondary shaft 224 in either the first engaged position or the second engaged position (block 510) depending on the desired gear ratio. If the shafts engage, then the primary shaft brake 230 is released (block 512) and the secondary shaft brake 240 is released (block 514). If the shafts do not engage, then the method includes shifting the secondary shaft 224 to the disengaged (e.g., neutral) position (block 516) and pulsing (e.g., disengaging and reengaging) the primary shaft brake 230 (block 518). The method then returns to block 510 for another attempt to engage the shafts. The pulsing of the primary shaft brake will have permitted the primary shaft to rotate so that the teeth of the gears that are being engaged are differently aligned, facilitating meshing together.

Figure 6:
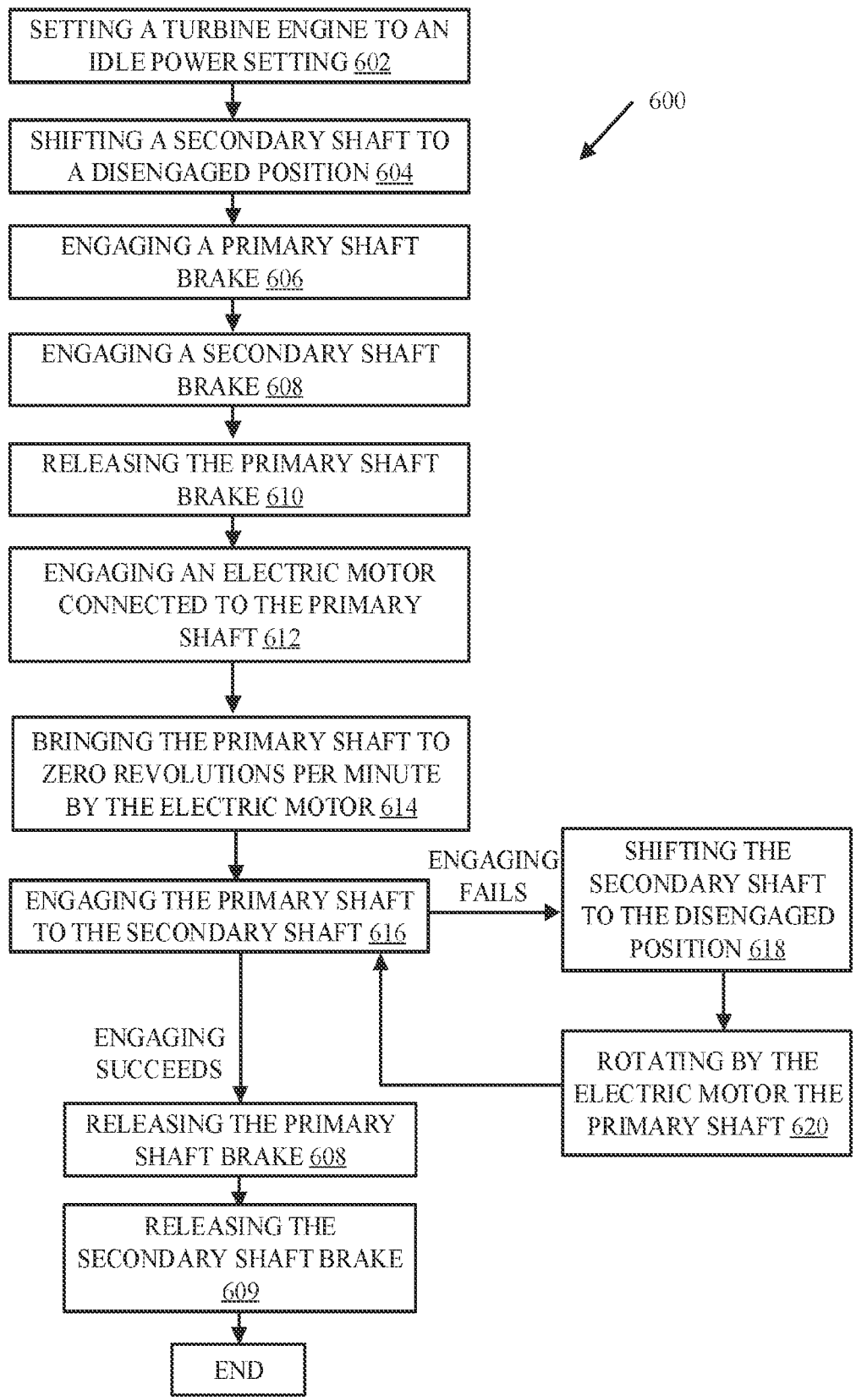

With reference to FIG. 6, and continuing reference to FIGS. 1A-3, a further method 600 of operating the turbine driven pump gearbox system to engage the turbine driven pump gearbox system in a drive (engaged) configuration is provided. The method may be executed without utilization of a torque converter. The method may include setting a turbine engine 4 to an idle power setting (block 602). The method may include shifting the secondary shaft 224 to a disengaged (e.g., neutral) position (block 604). The method may include engaging a primary shaft brake 230 (block 606). The method may include engaging a secondary shaft brake 240 (block 608). The method may include releasing the primary shaft brake 230 (block 610). The method may include engaging an electric motor, such as a power takeoff device 202 comprising a generator being backfed and connected to the primary shaft (block 612). The method may include bringing the primary shaft to zero revolutions per minute by the electrical motor (block 614). The method may include engaging the primary shaft 214 to the secondary shaft 224 in either the first engaged position or the second engaged position (block 616) depending on the desired gear ratio. If the shafts engage, then the primary shaft brake 230 is released (block 608) and the secondary shaft brake 240 is released (block 609). If the shafts do not engage, then the method includes shifting the secondary shaft 224 to the disengaged (e.g., neutral) position (block 618) and rotating, by the electric motor, the primary shaft (block 620). In various embodiments, the rotating is less than 25% of a gear tooth width. The method then returns to block 616 for another attempt to engage the shafts. The rotating of the primary shaft by the motor will have permitted the primary shaft to rotate so that the teeth of the gears that are being engaged are differently aligned, facilitating meshing together.

Throughout the preceding discussion, reference has been made to gear ratios and a first gear ratio associated with a set of engaged gears and a second gear ratio associated with a second set of engaged gears. One may appreciate that more than two sets of gears may be implemented. For example, the primary shaft assembly may have one or three or four or any number of gears. Similarly, the secondary shaft assembly may have one or three or four or any number of gears. The different shaft assemblies may have different number of gears. Additionally, different gear ratios may be contemplated. It was previously mentioned that the combination of the first primary shaft gear 212 and the first secondary shaft gear 222 gear has a first gear ratio and the combination of the second primary shaft gear 216 and the second secondary shaft gear 226 has a second gear ratio that is different from the first gear ratio so that at least one of the speed and the torque applied to the input of the hydraulic fracing pump 320 is different in the first engaged position and in the second engaged position. The first gear ratio may, in various embodiments, comprise between about 1 to about 2, or may comprise about 1.3 to about 1.5 or may comprise about 1.4 or may comprise 1.4 or may comprise any other ratio as desired. The second gear ratio may, in various embodiments, comprise between about 1 to about 2, or may comprise about 1.5 to about 1.7 or may comprise about 1.67 or may comprise 1.67 or may comprise any other ratio as desired.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any or any combination of programming or scripting languages such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, LINUX applications, any real-time operating system applications, webpages, websites, web forms, prompts, etc. Practitioners will appreciate that the illustrated steps described herein may comprise, in any number of configurations, including the use of WINDOWS® applications, LINUX applications, any real-time operating systems applications, webpages, web forms, popup WINDOWS® applications, any real-time operating system applications, popup LINUX applications, prompts, and the like.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a removable memory chip (such as an erasable programmable read only memory (EPROM), programmable read only memory (PROM)) and associated socket, or other removable storage units and interfaces, which allow software and data to be transferred from the removable storage unit to a computer system.

The computer system or device may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A turbine driven pump gearbox system comprising:
   a turbine engine;
   a planetary gearbox driven by the turbine engine;
   a primary shaft driven directly by the planetary gearbox, the primary shaft having a first primary shaft gear and a second primary shaft gear;
   a power takeoff device for generating power when driven by the primary shaft;
   a secondary shaft having a first secondary shaft gear and a second secondary shaft gear;
   a collar associated with the secondary shaft for selectively disengaging or engaging the primary shaft and the secondary shaft in at least one of three positions:
      a first engaged position where the first primary shaft gear engages the first secondary shaft gear;
      a second engaged position where the second primary shaft gear engages the second secondary shaft gear;
      a disengaged position, being a neutral position, where the primary shaft is disengaged from the secondary shaft;
   a primary shaft brake for braking a primary shaft rotation; and
   a secondary shaft brake for braking a secondary shaft rotation,
   wherein the power takeoff device, the primary shaft brake, and the secondary shaft brake are controlled as a clutch to shift engagement of the primary shaft and the secondary shaft among the first engaged position, second engaged position, and disengaged position.

2. The turbine driven pump gearbox system according to claim 1, wherein the power takeoff device is configured to run as a motor to control movement of the primary shaft.

3. The turbine driven pump gearbox system according to claim 2, wherein the power takeoff device is a generator configured to generate electricity in a generator mode and configured to run as the motor to control movement of the primary shaft in a motor mode.

4. The turbine driven pump gearbox system according to claim 1, further comprising a shifter in mechanical connection with the collar to move the collar for selectively disengaging or engaging the primary shaft and the secondary shaft in the at least one of three positions.

5. The turbine driven pump gearbox system according to claim 1, wherein a first gear ratio of the first primary shaft gear and the first secondary shaft gear is different than a second gear ratio of the second primary shaft gear and the second secondary shaft gear.

6. The turbine driven pump gearbox system according to claim 1, further comprising a hydraulic fracing pump driven by the secondary shaft, wherein there is no torque converter between the planetary gearbox and the hydraulic fracing pump.

7. The turbine driven pump gearbox system according to claim 1, wherein an electronic controller selectably actuates at least one of (i) the power takeoff device to run as a motor to apply a counter rotation force to the primary shaft and (ii) a primary shaft brake control to apply a braking force to the primary shaft in concert with the shifting of the primary shaft and the secondary shaft between at least two of the first engaged position, second engaged position, and disengaged position.

8. The turbine driven pump gearbox system according to claim 7, further comprising a sensor connected to an outlet of a pump driven by the secondary shaft and measuring a pressure of a fluid pumped by the pump, wherein the electronic controller also selectably actuates (iii) a shifter to shift the primary shaft and the secondary shaft between at least two of the first engaged position, second engaged position, and disengaged position in response to the pressure exceeding an upper or lower threshold.

9. A switchable pump transmission assembly for a turbine driven pump gearbox system, the switchable pump transmission assembly comprising:
a primary shaft configured to connect to a rotating motive source, the primary shaft having a first primary shaft gear and a second primary shaft gear;
a power takeoff device for generating power when driven by the primary shaft;
a secondary shaft configured to connect to a rotating motive load, the secondary shaft having a first secondary shaft gear and a second secondary shaft gear;
a collar associated with the secondary shaft for selectively disengaging or engaging the primary shaft and the secondary shaft in at least one of three positions:
a first engaged position where the first primary shaft gear engages the first secondary shaft gear;
a second engaged position where the second primary shaft gear engages the second secondary shaft gear;
a disengaged position, being a neutral position, where the primary shaft is disengaged from the secondary shaft;
a primary shaft brake for braking a primary shaft rotation; and
wherein the power takeoff device and the primary shaft brake are controlled as a clutch to shift engagement of the primary shaft and the secondary shaft among the first engaged position, second engaged position, and disengaged position.

10. The switchable pump transmission assembly of claim 9, further comprising a secondary shaft brake for braking a secondary shaft rotation.

11. The switchable pump transmission assembly according to claim 9, wherein the power takeoff device is configured to run as a motor to control movement of the primary shaft.

12. The switchable pump transmission assembly according to claim 9, wherein the power takeoff device is a generator configured to generate electricity in a generator mode and configured to run as a motor to control movement of the primary shaft in a motor mode.

13. The switchable pump transmission assembly according to claim 9, further comprising a shifter in mechanical connection with the collar to move the collar for selectively disengaging or engaging the primary shaft and the secondary shaft in the at least one of three positions.

14. The switchable pump transmission assembly according to claim 9, wherein a first gear ratio of the first primary shaft gear and the first secondary shaft gear is different than a second gear ratio of the second primary shaft gear and the second secondary shaft gear.

15. The switchable pump transmission assembly according to claim 9, further comprising an electronic controller connected to the power takeoff device and connected to a primary shaft brake control, wherein the electronic controller selectably actuates at least one of (i) the power takeoff device to run as a motor to apply a counter rotation force to the primary shaft and (ii) the primary shaft brake control to apply a braking force to the primary shaft in concert with the shifting of the primary shaft and the secondary shaft between at least two of the first engaged position, second engaged position, and disengaged position.

16. The switchable pump transmission assembly according to claim 15, further comprising a sensor connected to the electronic controller and configured to measure a pressure of a fluid pumped by a pump driven by the secondary shaft, wherein the electronic controller also selectably actuates (iii) a shifter to shift the primary shaft and the secondary shaft between at least two of the first engaged position, second engaged position, and disengaged position in response to the pressure exceeding an upper or lower threshold.

17. The switchable pump transmission assembly according to claim 9, further comprising a pump connected to the secondary shaft and driven by a rotation of the secondary shaft, wherein the switchable pump transmission assembly does not include a torque converter.

18. The switchable pump transmission assembly according to claim 9, wherein the switchable pump transmission assembly does not include a torque converter.

19. A method of operating a turbine driven pump gearbox system to change at least one of a speed and a torque applied to an input of a hydraulic fracing pump without utilization of a torque converter, the method comprising:
driving, by a turbine engine, a primary shaft of the turbine driven pump gearbox system to rotate,
wherein the primary shaft of the turbine driven pump gearbox system has a first primary shaft gear and a second primary shaft gear attached to the primary shaft, the first primary shaft gear and the second primary shaft gear spaced apart along a length of the primary shaft and rotated thereby;
engaging a first secondary shaft gear of a secondary shaft with the first primary shaft gear of the primary shaft,
wherein the secondary shaft of the turbine driven pump gearbox system has the first secondary shaft gear and a second secondary shaft gear attached to the secondary shaft, the first secondary shaft gear and the second secondary shaft gear spaced apart along a length of the secondary shaft and rotated thereby;
driving, by the primary shaft, the secondary shaft in response to the engaging, the secondary shaft providing power to the input of the hydraulic fracing pump;
translating a collar attached to the secondary shaft between the first secondary shaft gear and the second secondary shaft gear, the translating axially shifting the secondary shaft from a first engaged position to a disengaged position,
disengaging the first primary shaft gear from the first secondary shaft gear in response to the translating, whereby the primary shaft no longer drives the secondary shaft to rotate when the secondary shaft is in the disengaged position;

rotating the secondary shaft while the secondary shaft is in the disengaged position by an electric motor to align the second primary shaft gear and the second secondary shaft gear for engaging;

further translating the collar, the further translating axially shifting the secondary shaft from the disengaged position to a second engaged position; and engaging, the second secondary shaft gear of the secondary shaft to the second primary shaft gear of the primary shaft in response to the further translating, whereby the primary shaft drives the secondary shaft to rotate, wherein a combination of the first primary shaft gear and the first secondary shaft gear has a first gear ratio and a combination of the second primary shaft gear and the second secondary shaft gear has a second gear ratio that is different from the first gear ratio so that at least one of the speed and the torque applied to the input of the hydraulic fracing pump is different in the first engaged position and in the second engaged position.

* * * * *